United States Patent
Park et al.

(10) Patent No.: US 7,221,833 B2
(45) Date of Patent: May 22, 2007

(54) OPTICAL CABLE WITH EASILY REMOVABLE INNER SHEATH

(75) Inventors: Do-Hyun Park, Gyeonggi-do (KR); Gi-Joon Nam, Seoul (KR)

(73) Assignee: LG Cable, Ltd., Seoul (KR)

( * ) Notice: Subject to any disclaimer, the term of this patent is extended or adjusted under 35 U.S.C. 154(b) by 0 days.

(21) Appl. No.: 10/979,586

(22) Filed: Nov. 2, 2004

(65) Prior Publication Data
US 2006/0045441 A1    Mar. 2, 2006

(30) Foreign Application Priority Data
Aug. 25, 2004    (KR)  .................... 10-2004-0067256

(51) Int. Cl.
*G02B 6/44*    (2006.01)

(52) U.S. Cl. ............... 385/106; 385/100; 385/102; 385/105

(58) Field of Classification Search ......... 385/100–110
See application file for complete search history.

(56) References Cited

U.S. PATENT DOCUMENTS

| | | | |
|---|---|---|---|
| 5,505,773 A * | 4/1996 | Vitands et al. | 516/100 |
| 6,114,456 A * | 9/2000 | Dewart et al. | 525/240 |
| 6,815,023 B1* | 11/2004 | Tatarka et al. | 428/34.9 |
| 2002/0119288 A1* | 8/2002 | Morman et al. | 428/152 |
| 2003/0031818 A1* | 2/2003 | Horacek | 428/36.9 |
| 2004/0197057 A1* | 10/2004 | Lee et al. | 385/100 |
| 2004/0213527 A1* | 10/2004 | Martinsson | 385/100 |

* cited by examiner

*Primary Examiner*—Brian Healy
*Assistant Examiner*—Charlie Peng
(74) *Attorney, Agent, or Firm*—Jones Day

(57) ABSTRACT

Disclosed is an optical cable with a secondary sheath for surrounding and protecting a plurality of optical fiber units in which at least 1-core optical fiber is mounted in a buffer tube, wherein the secondary sheath is made of a mixture including 100 parts by weight of base resin selected from the group consisting of low density polyethylene, linear low density polyethylene, and their mixture; and 0.2 to 60 parts by weight of inorganic additive. The secondary sheath of this optical cable shows excellent cutting and tear characteristics and ensures easy contact and divergence.

16 Claims, 1 Drawing Sheet

OPTICAL CABLE WITH EASILY REMOVABLE INNER SHEATH

BACKGROUND OF THE INVENTION

1. Field of the Invention

The present invention relates to an optical cable having a secondary sheath for surrounding and protecting a plurality of optical fiber units in which at least one-core optical fiber is mounted in a buffer tube.

2. Description of the Related Art

As various communication services such as bi-directional communications and image communications are propagated more broadly at home and abroad, a demand for optical cables keeps increasing. Referring to FIG. 1, a general optical cable 20 has a plurality of optical fiber units 10 in which 1- to 12-core optical fiber 13 is mounted in a buffer tube 15 and a jelly 11 is selectively filled therein. The plurality of optical fiber units 10 are inserted into and protected by a secondary sheath 16, and the secondary sheath 16 may be filled with waterproof powder or jelly 17 for making it watertight. In addition, the outside of the secondary sheath 16 is selectively wrapped by a waterproof tape or paper 18, and the outermost layer is protected by a primary sheath 19 made of resin.

Among the elements composing the optical cable, the secondary sheath plays a role of protecting the optical fiber units in the sheath and reinforcing tensile force of the cable that is required for its circumstances. Conventionally, the secondary sheath is frequently made of hard resin such as high density polyethylene and polypropylene with excellent mechanical features in consideration of its primary function for protecting the optical fiber units.

However, such hard polymer materials are not easily shed and require experienced skill for shedding, so they take much time for contact of optical fibers during the cable installation process. That is to say, in order to branch off the cable in a midway position, some strands of optical fibers should be taken out after the primary and secondary sheaths are shed. However, the secondary sheath made of hard polymer materials such as high density polyethylene may damage the buffer tube and the optical fiber when being shed, and it is also difficult to make its surface be cut smoothly. In order to shed the secondary sheath, an effective way is to make a scar on a certain region of the secondary sheath and then tear it. However, the hard high density polyethylene has not good tear characteristic due to bad initial brittleness and strong tenacity. In addition, since the secondary sheath is elongated while being torn, it is not easy to tear it over several ten centimeters smoothly.

Meanwhile, a plasticized PVC made by adding a plasticizer to give flexibility to hard PVC is sometimes used as a material of the secondary sheath. However, the plasticized PVC may cause a fatal problem on the optical fiber in the buffer tube when the contained plasticizer is leaked out, so very limited kinds of materials may be used for the buffer tube.

SUMMARY OF THE INVENTION

The present invention is designed to solve the problems of the prior art, and therefore it is an object of the present invention to provide an optical cable with an easily removable secondary sheath for allowing easy contact and divergence.

In order to accomplish the above object, the present invention provides an optical cable with a secondary sheath for surrounding and protecting a plurality of optical fiber units in which at least 1-core optical fiber is mounted in a buffer tube, wherein the secondary sheath is made of a mixture comprising: 100 parts by weight of base resin selected from the group consisting of low density polyethylene, linear low density polyethylene, and their mixture; and 0.2 to 60 parts by weight of inorganic additive.

In another aspect of the invention, 1 to 30 parts by weight of medium density polyethylene is added to the base resin so that the secondary sheath may give suitable hardness together with excellent cutting and tear characteristics.

BRIEF DESCRIPTION OF THE DRAWINGS

Other objects and aspects of the present invention will become apparent from the following description of embodiments with reference to the accompanying drawing in which.

DESCRIPTION OF THE PREFERRED EMBODIMENT

Figure 1:
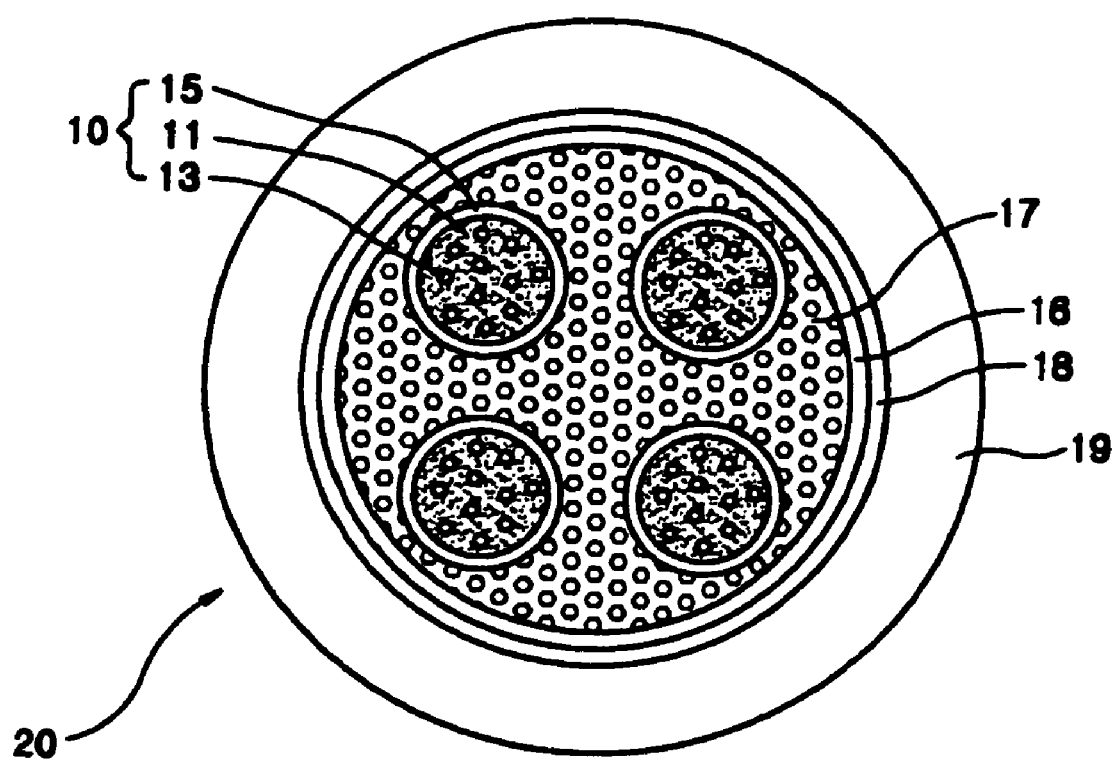
FIG. 1 is a sectional view showing a general optical cable with a secondary sheath.

Hereinafter, the present invention will be described in more detail referring to the drawings.

In the present invention, as a material of a secondary sheath for surrounding and protecting a plurality of optical fiber units, base resin composed of low density polyethylene and/or linear low density polyethylene that has low tensile strength and low tear strength among mechanical features is mixed with inorganic additive at a predetermined ratio and then used.

Low density polyethylene, linear low density polyethylene, and their mixture used as the base resin for forming the secondary sheath in an optical cable according to the present invention have low tensile strength and low tear strength, differently from high density polyethylene or medium density polyethylene, so the secondary sheath made of them may be easily shed in a predetermined section when the optical cable is diverged or contacted. The used low density polyethylene and linear low density polyethylene preferably have a melt index (MI) of 0.2 to 2. If the melt index is less than 0.2, molecular weight is increased to make extrusion more difficult. If the melt index exceeds 2, the melting strength is so low that a circular tube is not easily extruded or shaped, and the extruded tube may be easily crushed by external force.

In addition, in the optical cable of the present invention, inorganic additive is added to the mixture that forms the secondary sheath. The inorganic additive may employ not only calcium carbonate, talc, clay and silica, but also metal hydroxide such as aluminum hydroxide and magnesium hydroxide that has flame retardant. The inorganic additive may be surface-treated when necessary. In addition, calcium carbonate has a mean diameter of 1 to 10 µm, which may be surface-treated by stearic acid as required. Silica may be ground silica, precipitated silica, fumed silica surface-treated by silane, or the like. Such inorganic additives change inherent softness of the base resin composed of low density polyethylene or linear low density polyethylene into semi-hard material, thereby improving the cutting and tear features of the secondary sheath. A content of the inorganic additives is 0.2 to 60 parts by weight on the basis of 100 parts by weight of the base resin. If the content of the inorganic additives is less than 0.2 parts by weight, the aforementioned effects enjoyed by the inorganic additives are not well realized. If the content exceeds 60 parts by weight, extrusion ability is deteriorated and the secondary sheath becomes too hard. Selectively, 1 to 30 parts by weight of medium density polyethylene may be further mixed to the base resin so that the second sheath may have suitable hardness together with excellent cutting and tear features. If a content of medium density polyethylene is less than 1 parts by weight, the effects of the medium density polyethylene mentioned above are not well realized. If the content exceeds 30 parts by weight, tensile strength and tear strength of the secondary sheath are more increased, thereby deteriorating the cutting feature.

In addition to them, in the optical cable of the present invention, various additives may be added to the mixture that forms the secondary sheath, if they do not obstruct the object of the present invention. For example, processing aids such as low molecular weight wax, fatty acid lubricant and silicon lubricant may be added in order to improve workability and productivity of the extrusion process, and amine or phenol antioxidant may be added thereto in order to restrain oxidation of the materials and improve their heating characteristics during the extrusion process. A preferred content of the processing aid and the antioxidant is respectively 0.1 to 5 parts by weight.

Hereinafter, embodiments are described in detail for helping to understand the present invention. However, embodiments of the present invention may be variously modified, and the scope of the invention should not be interpreted to be limited to the following embodiments. The embodiments of the present invention are given only in a way of giving better explanation to those skilled in the art.

Embodiments 1 to 6 and Comparative Examples 1 to 4

Components stated in the following tables 1 and 2 were used in the embodiments and the comparative examples. With keeping a surface temperature of 8 inch electric-or oil-heating roll mill in the range of 120 to 130° C., resin was put in advance and melt, and then inorganic additives were added thereto to make a mixture by mixing them for about 20 minutes. After that, a heating press was used to apply a pressure of 250 kgf/mm$^2$ or above to the mixture at 170° C. for 20 minutes so that the mixture was shaped into a sheet that is then made into test pieces.

TABLE 1

| Components | Embodiments (parts by weight) | | | | | |
|---|---|---|---|---|---|---|
| | 1 | 2 | 3 | 4 | 5 | 6 |
| Low density polyethylene (MI: 1.0) | 100 | — | — | 100 | — | — |
| Linear low density polyethylene (MI: 0.7) | — | 100 | — | — | — | 100 |
| Linear low density polyethylene (MI: 1.5) | — | — | 100 | — | 100 | — |
| Medium density polyethylene | — | — | — | 5 | 5 | — |
| Calcium carbonate (particle size: 1 micron) | 30 | — | 10 | 5 | — | — |
| Calcium carbonate (particle size: 10 microns) | — | 20 | — | — | 5 | — |
| Precipitated silica | — | — | 5 | — | 3 | — |
| Ground silica | — | — | — | 3 | — | — |
| Magnesium hydroxide | — | — | — | — | — | 30 |
| Antioxidant | 1 | 1 | 1 | 1 | 1 | 1 |
| Lubricant | 1.5 | 1.5 | 1.5 | 1.5 | 1.5 | 1.5 |

TABLE 2

| Components | Comparative examples (parts by weight) | | | |
|---|---|---|---|---|
| | 1 | 2 | 3 | 4 |
| High density polyethylene | 100 | — | — | — |
| Medium density polyethylene | — | 100 | 100 | — |
| Linear low density polyethylene (MI: 0.1) | — | — | — | 20 |
| Ethylene ethylacrylate | — | — | — | 80 |
| Carbon black | — | — | 3 | — |
| Magnesium hydroxide | — | — | — | 80 |

EXPERIMENTAL EXAMPLES

Properties of the test pieces made according to the embodiments and the comparative examples were measured as below, and shown in the following table 3.

Tensile Strength, Elongation

Tensile strength and elongation were measured in accordance with ASTM D 638.

Tear Strength, Tear Elongation

Tear strength and tear elongation were measured in accordance to ASTM D 882.

Impact Strength

Impact strength was measured in accordance with ASTM D 1709.

Hardness

Hardness was measured in accordance to ASTM D 2240 by means of shore D.

TABLE 3

| Properties | Embodiments | | | | | | Comparative examples | | | |
|---|---|---|---|---|---|---|---|---|---|---|
| | 1 | 2 | 3 | 4 | 5 | 6 | 1 | 2 | 3 | 4 |
| Tensile strength (kgf/mm$^2$) | 1.1 | 1.64 | 1.62 | 1.29 | 1.72 | 1.89 | 3.2 | 2.9 | 2.78 | 1.4 |
| Elongation (%) | 500 | 540 | 512 | 621 | 583 | 578 | 830 | 890 | 860 | 580 |
| Tear strength (kgf/cm) | 90 | 98 | 86 | 95 | 89 | 92 | 156 | 141 | 139 | 98 |
| Tear elongation (%) | 89 | 92 | 86 | 95 | 91 | 95 | 122 | 134 | 130 | 112 |
| Impact strength (g) | 21 | 29 | 32 | 28 | 34 | 38 | 210 | 182 | 178 | 120 |
| Hardness (shore D) | 46 | 52 | 51 | 43 | 51 | 52 | 71 | 63 | 62 | 43 |

Seeing Table 3, it may be understood that the secondary sheath according to the embodiments of the present invention may be easily shed and cut off since its material has low tensile strength, low elongation, low tear strength, low impact strength and low hardness. However, the materials of the secondary sheath according to the comparative examples show high values for the above properties, so the secondary sheath made by them is not easily cut off and shed, but elongated when being torn, so its cut surface is not smooth.

APPLICABILITY TO THE INDUSTRY

As described above, the secondary sheath according to the present invention has excellent cutoff and tear characteristics, so it ensures easy contact and divergence of the optical cable.

What is claimed is:

1. An optical cable with a secondary sheath for surrounding and protecting a plurality of optical fiber units in which at least 1-core optical fiber is mounted in a buffer tube, wherein the secondary sheath is made of a mixture comprising:
   100 parts by weight of base resin selected from the group consisting of low density polyethylene, linear low density polyethylene, and their mixture; and
   0.2 to 60 parts by weight of inorganic additive;
   wherein the low density polyethylene and the linear low density polyethylene have a melt index of 0.2 to 2, and
   wherein the inorganic additive is calcium carbonate which has a mean diameter of 1 to 10 μm.

2. An optical cable with a secondary sheath for surrounding and protecting a plurality of optical fiber units in which at least 1-core optical fiber is mounted in a buffer tube, wherein the secondary sheath is made of a mixture comprising:
   100 parts by weight of base resin selected from the group consisting of low density polyethylene, linear low density polyethylene, and their mixture; and
   0.2 to 60 parts by weight of inorganic additive;
   wherein the low density polyethylene and the linear low density polyethylene have a melt index of 0.2 to 2, and
   wherein the inorganic additive is silica which is ground silica, precipitated silica, or fumed silica surface-treated by silane.

3. The optical cable according to claim 1 or 2, wherein the mixture further comprises 0.1 to 5 parts by weight of antioxidant.

4. The optical cable according to claim 1 or 2, wherein the mixture further comprises 0.1 to 5 parts by weight of processing aid.

5. An optical cable with a secondary sheath for surrounding and protecting a plurality of optical fiber units in which at least 1-core optical fiber is mounted in a buffer tube, wherein the secondary sheath is made of a mixture comprising:
   100 parts by weight of base resin including any of low density polyethylene, linear low density polyethylene, and their mixture; and
   0.2 to 60 parts by weight of inorganic additive,
   wherein the low density polyethylene and the linear low density polyethylene have a melt index of 0.2 to 2, and
   wherein the base resin further comprises 1 to 30 parts by weight of medium density polyethylene.

6. The optical cable according to claim 5,
   wherein the inorganic additive is at least one selected from the group consisting of calcium carbonate, talc, silica, clay, aluminum hydroxide, magnesium hydroxide, and their mixtures.

7. The optical cable according to claim 6, wherein the calcium carbonate has a mean diameter of 1 to 10 μm.

8. The optical cable according to claim 6,
   wherein the silica is ground silica, precipitated silica, or fumed silica surface-treated by silane.

9. The optical cable according to claim 5, wherein the mixture further comprises 0.1 to 5 parts by weight of antioxidant.

10. The optical cable according to claim 5, wherein the mixture further comprises 0.1 to 5 parts by weight of processing aid.

11. An optical cable with a secondary sheath for surrounding and protecting a plurality of optical fiber units in which at least 1-core optical fiber is mounted in a buffer tube, wherein the secondary sheath is made of a mixture comprising:
    100 parts by weight of base resin including any of low density polyethylene, linear low density polyethylene, and their mixture; and
    0.2 to 60 parts by weight of inorganic additive,
    wherein the base resin further comprises 1 to 30 parts by weight of medium density polyethylene.

12. The optical cable according to claim 11,
    wherein the inorganic additive is at least one selected from the group consisting of calcium carbonate, talc, silica, clay, aluminum hydroxide, magnesium hydroxide, and their mixtures.

13. The optical cable according to claim 12, wherein the calcium carbonate has a mean diameter of 1 to 10 μm.

14. The optical cable according to claim 12,
    wherein the silica is ground silica, precipitated silica, or fumed silica surface-treated by silane.

15. The optical cable according to claim 11,
    wherein the mixture further comprises 0.1 to 5 parts by weight of antioxidant.

16. The optical cable according to claim 11,
    wherein the mixture further comprises 0.1 to 5 parts by weight of processing aid.

* * * * *